United States Patent
Thulin

(10) Patent No.: US 6,478,921 B1
(45) Date of Patent: Nov. 12, 2002

(54) METHOD FOR PRODUCING ENDS OF METAL OF COMPOSITE PIPE LENGTHS

(76) Inventor: Dag Thulin, 19, avenue Hoche, FR-75006 Paris (FR)

( * ) Notice: Subject to any disclaimer, the term of this patent is extended or adjusted under 35 U.S.C. 154(b) by 0 days.

(21) Appl. No.: 09/530,093

(22) PCT Filed: Oct. 23, 1998

(86) PCT No.: PCT/SE98/01917

§ 371 (c)(1),
(2), (4) Date: Jun. 22, 2000

(87) PCT Pub. No.: WO99/21696

PCT Pub. Date: May 6, 1999

(30) Foreign Application Priority Data

Oct. 24, 1997 (SE) .............................. 9703895

(51) Int. Cl.$^7$ ............................... B29C 70/00

(52) U.S. Cl. ....................... 156/252; 156/305; 264/262; 138/109

(58) Field of Search ................................. 156/252, 305, 156/153; 264/262; 138/109

(56) References Cited

U.S. PATENT DOCUMENTS

| | | | | |
|---|---|---|---|---|
| 4,009,063 A | * | 2/1977 | Wood | 138/141 |
| 5,443,099 A | * | 8/1995 | Chaussepied et al. | 138/109 |
| 5,665,187 A | * | 9/1997 | Mackellar | 156/294 |

FOREIGN PATENT DOCUMENTS

DE          44 02 984 A1    8/1995

OTHER PUBLICATIONS

JP1257034—Abstract of JP, vol. 14, No. 10 (Jan. 10, 1989).
JP2310039—Abstract of JP, vol. 15, No. 97, (Mar. 8, 1991).
JP1101140—Abstract of JP, vol. 13, No. 311, (Jul. 17, 1989).

* cited by examiner

*Primary Examiner*—Jeff H Aftergut
(74) *Attorney, Agent, or Firm*—Dickstein Shapiro Morin & Oshinsky, LLP

(57) ABSTRACT

The invention relates to a method for producing ends of metal of composite pipes, comprising a casing pipe (1) of metal and a load carrying sheath (6, 7) of reinforced plastics, which sheath is produced in that the reinforcement is filled with polymer through injection under vacuum through injection pipes, said reinforcement comprises a first reinforcement layer (6) and a second reinforcement layer (7). To achieve the above-mentioned ends of metal the invention suggests that a sleeve (2) of the same thickness of material as the first reinforcement (6) is attached to the casing pipe (1) at both ends of said casing pipe, that the first reinforcement layer (6) is applied thereafter to the same thickness of material as the sleeves (2) over the whole length of the casing pipe, that a sheet metal strip (3) of preferably the same material as the casing pipe and with a greater width than the axial length of the sleeves is attached at the sleeves, respectively, and wound together with the second reinforcement layer (7) onto the sleeves as well as onto a part of the first reinforcement layer (6), the sheet metal strip having a step-like reduced thickness in the direction of its width to a depth corresponding to the thickness of material of the second reinforcement layer (7), so that said second reinforcement layer will be placed between the winding layers of the sheet metal strip, while the part of the sheet metal strips not being stepped will lie against each other, forming an end totally of metal at the pipe length, said pipe length being finished by injection in both reinforcement layers of a suitable resin.

3 Claims, 1 Drawing Sheet

METHOD FOR PRODUCING ENDS OF METAL OF COMPOSITE PIPE LENGTHS

The invention relates to a method for producing ends of metal of composite pipe lengths, particularly such pipe lengths comprising a casing pipe of metal and a load-carrying sheath of reinforced plastics, which sheath is produced by applying reinforcement onto said casing pipe and filling said reinforcement with resin through injection under vacuum by pipes or cannulas, said reinforcement preferably comprising a first reinforcement layer closest to the casing pipe for carrying peripheral loads and a second reinforcement layer on the outside of the first-mentioned reinforcement layer for carrying axial loads on the pipe.

There is today no known techniques for producing ends of metal of such composite pipe lengths, which ends are intended to be joined at each other by known and classified techniques to form a pipeline of great length. Said pipeline has to withstand large pressure and high temperature. Such pipelines are intended for production and transportation of i.e. natural gas and oil.

Therefore, the object of the invention is to suggest a method for producing ends of metal of composite pipe lengths, which ends can be joined together by known and classified techniques, for instance by welding or a flange coupling.

This object is achieved according to the invention in that a sleeve of preferably the same metal as the casing pipe and with the same thickness of material as the first reinforcement layer is attached to the casing pipe at both ends of said casing pipe, wherein at least one of said sleeves are provided with axial through holes for injection pipes and vacuum connections, that the first reinforcement layer is applied thereafter to the same thickness of material as the sleeves over the whole length of the casing pipe between the sleeves and placing successively at the same time said injection pipes in parallel relationship to the longitudinal axis of the casing pipe, that a sheet metal strip of preferably the same metal as said casing pipe and with a greater width than the axial length of the sleeves is attached to said sleeves, respectively, and wound together with the second reinforcement layer onto the sleeves as well as onto a part of the first reinforcement layer, the sheet metal strip having a steplike reduced thickness in the direction of its width to a depth corresponding to the thickness of material of the second reinforcement layer, so that said second reinforcement layer will be placed between the winding layers of the sheet metal strip, while the part of the winding layers of the sheet metal strip not being stepped will lie upon each other without any intermediate reinforcement, forming an end surface totally of metal at the pipe length, the pipe length then being finished by injection of a suitable polymer in both reinforcement layers.

Figure 1:
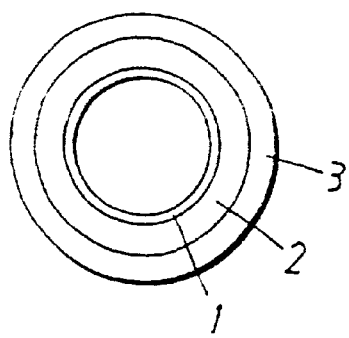
Figure 2:
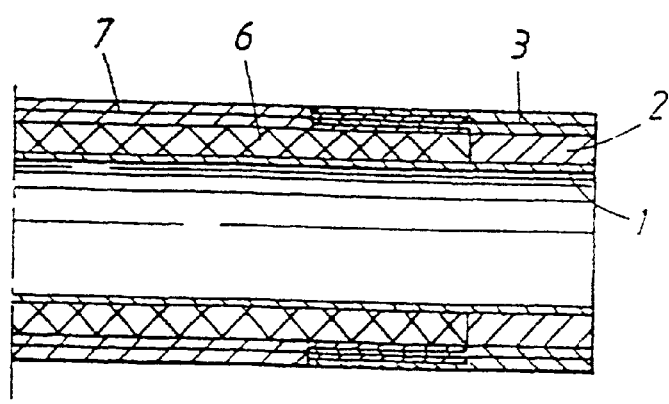
Figure 3:
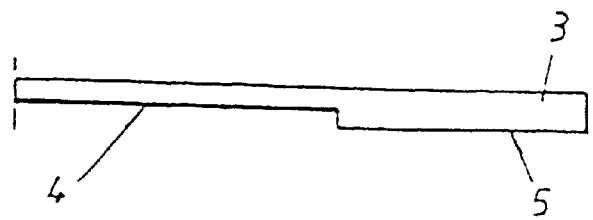

A non-limiting example of the invention will now be described with reference to the accompanying drawings, in which FIG. 1 is an end view of an end of metal of a composite pipe, FIG. 2 is a longitudinal section of the end of metal attached to a composite pipe, and FIG. 3 is an enlarged longitudinal section of a metal strip with a steplike reduced thickness, in which step a part of the second reinforcement layer is intended to be housed.

According to the invention, the casing pipe 1 of metal, preferably stainless steel, is provided at both ends with a sleeve 2 of the same material as the casing pipe, which sleeve is attached to the same by pressing and welding or brazing. The connection between sleeve and casing pipe shall have a tensile strength larger than that of the pipe. Preferably, the sleeves 2 are attached flush to the ends of the casing pipe 1. At least one of the sleeves is provided with axial through holes (not shown). Through some of these holes suitable injection pipes or cannulas are to be inserted. The remaining holes are to be connected to a vacuum source (not shown). A first reinforcement layer 6, preferably in the form of a fabric, is then wound in multiple turns around the casing pipe 1 between the sleeves 2, while at the same time placing the injection pipes in said reinforcement. Preferably, the injection pipes are pulled through the holes in the sleeve so deep that the mouths of the injection pipes are located near the second sleeve and will lay in parallel relationship to the longitudinal axis of the pipe.

The first reinforcement 6 is wound to a predetermined thickness and the sleeves 2 have to have the same thickness of material, so that there is a smooth and plane transition section between the sleeves and the reinforcement. This first reinforcement is intended only to carry the peripheral loads on the pipe. A sheet metal strip 3, preferably of the same material as the casing pipe, which strip has a steplike reduced thickness 4 along its width, is then attached to the sleeves, respectively, preferably by welding, in the longitudinal direction of the pipe and preferably flush to the ends of said sleeves. However, the sheet metal strip 3 has to have larger width than the axial length of the sleeves. This step 4 is large enough to house a second reinforcement layer 7, which is used to carry only the axial forces on the pipe and which extends between the strips 3.

The sheet metal strip is then wound together with the second reinforcement 7 in such a way that the non-reduced part 5 of the strip is wound onto the sleeve 2 and the second reinforcement will be placed between the different winding layers of the strip. When the second reinforcement 7 has been wound to the end, the sheet metal strip is still wound at least one turn, whereupon the edge of the strip is attached, preferably by welding, to the underlying winding layer. This results in that the winding layers of second reinforcement 7 are enclosed between the winding layers of the strip, and each fibre in said reinforcement will have an attachment surface which is large enough for producing a shear strength larger than the tensile strength of the fibre.

During this winding operation of the strip 3 together with the second reinforcement 7 onto the pipe the stepped part 4 of the strip and the part of the second reinforcement 7 covered by the stepped part of the strip is coated (wetted) either in that polymer is supplied in liquid or powder form depending upon which type of polymer that provides the adhesive power. This means that if a thermosetting plastic is used the total gluing between the second reinforcement and the stepped part of the sheet metal strip will be completed, when the strip 3 and the second reinforcement 7 have been wound to the end. If a thermoplastic is used, said thermoplastic is heated, after that the second reinforcement and the sheet metal strip have been wound to the end, and melted and then allowed to solidify for fastening the reinforcement between the surfaces of the strip. Also in this case the gluing is completed.

When the winding of the reinforcements 6, 7 and the sheet metal strip 3 is finished, the pipe is placed in a suitable mould, not shown, which is lifted essentially vertically and connected in its upper part to an injection pump and a vacuum pump, not shown, whereupon the injection of the polymer is carried out in known manner.

In this way a composite pipe is obtained with ends of metal, the adhesion of which in axial direction is greater than the corresponding strength of the total tensile strength of the laminate in axial direction.

This means that it is possible to join composite pipe lengths of the above mentioned type in any known manner and by classified techniques, i.e. by butt welding the ends, by flange couplings and so on.

It shall be mentioned that the part 4 of the sheet metal strips, which has a steplike reduced thickness, can be provided with holes or can be blasted for producing a rough surface to increase the adhesion power between the polymer and the strip.

In another type of composite pipes, which is not produced by the above-mentioned injection method, but comprises a casing pipe of metal and a load carrying sheath of reinforced plastics, which sheath is produced preferably by prepregs and which over its entire cross section in radial direction carries at the same time both peripheral loads and axial loads on the sheath, the above-mentioned sheet metal strip 3 is attached directly at the ends, respectively, of the casing pipe without the intermediate sleeve 2.

What is claimed is:

1. A method for producing ends of metal of composite pipe lengths comprising a casing pipe of metal and a load-carrying sheath of reinforced plastics, which sheath is produced by applying reinforcement onto said casing pipe and filling said reinforcement with resin through injection under vacuum by pipes or cannulas, said reinforcement comprising a first reinforcement layer closest to the casing pipe for carrying peripheral loads and a second reinforcement layer on the outside of the first reinforcement layer for carrying axial loads on the pipe, characterized in that a sleeve of the same metal as the casing pipe and with a same thickness of material as the first reinforcement layer is attached to the casing pipe at both ends of said casing pipe, wherein at least one of said sleeves are provided with axial through holes for injection pipes and vacuum connections, that the first reinforcement layer is applied thereafter to a same thickness of material as the sleeves over the whole length of the casing pipe between the sleeves and placing, successively simultaneously, injection pipes in parallel relationship to a longitudinal axis of the casing pipe, that a sheet metal strip of the same metal as said casing pipe and with a greater width than the axial length of the sleeves is attached to said sleeves, respectively, and wound together with the second reinforcement layer onto the sleeves as well as onto a part of the first reinforcement layer, the sheet metal strip having a steplike reduced thickness in a direction of its width to a depth corresponding to a thickness of material of the second reinforcement layer, so that said second reinforcement layer will be placed between the winding layers of the sheet metal strip, while the part of the winding layers of the sheet metal strip not being stepped will lie upon each other without any intermediate reinforcement, forming an end surface totally of metal at the pipe length, the pipe length then being finished by injection of a suitable polymer in both reinforcement layers.

2. A method according to claim 1, characterized in that a polymer in a form of a liquid or powder is applied simultaneously as the stepped sheet metal strip and the second reinforcement are wound onto the pipe length onto the surfaces of the stepped part and that part,of the second. reinforcement, which is covered by said stepped part.

3. A method according to claim 1, characterized in that the surface of the stepped part of the strip is machined for achieving better adhesion.

\* \* \* \* \*